D. F. REINHEIMER.
COMBINATION WAGON AND CAR.
APPLICATION FILED JUNE 26, 1909.
968,419.
Patented Aug. 23, 1910.
4 SHEETS—SHEET 2.
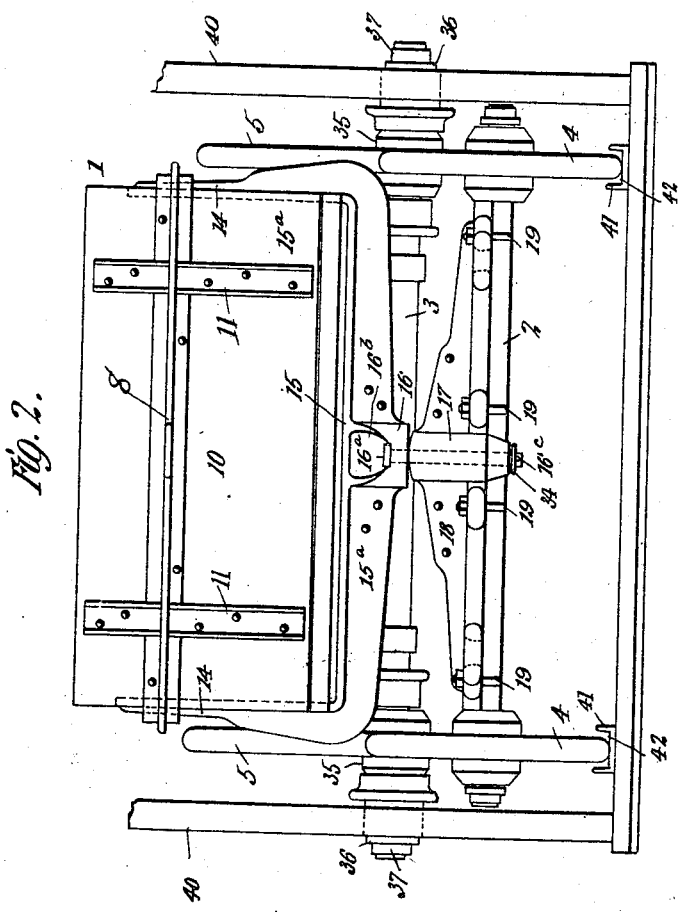

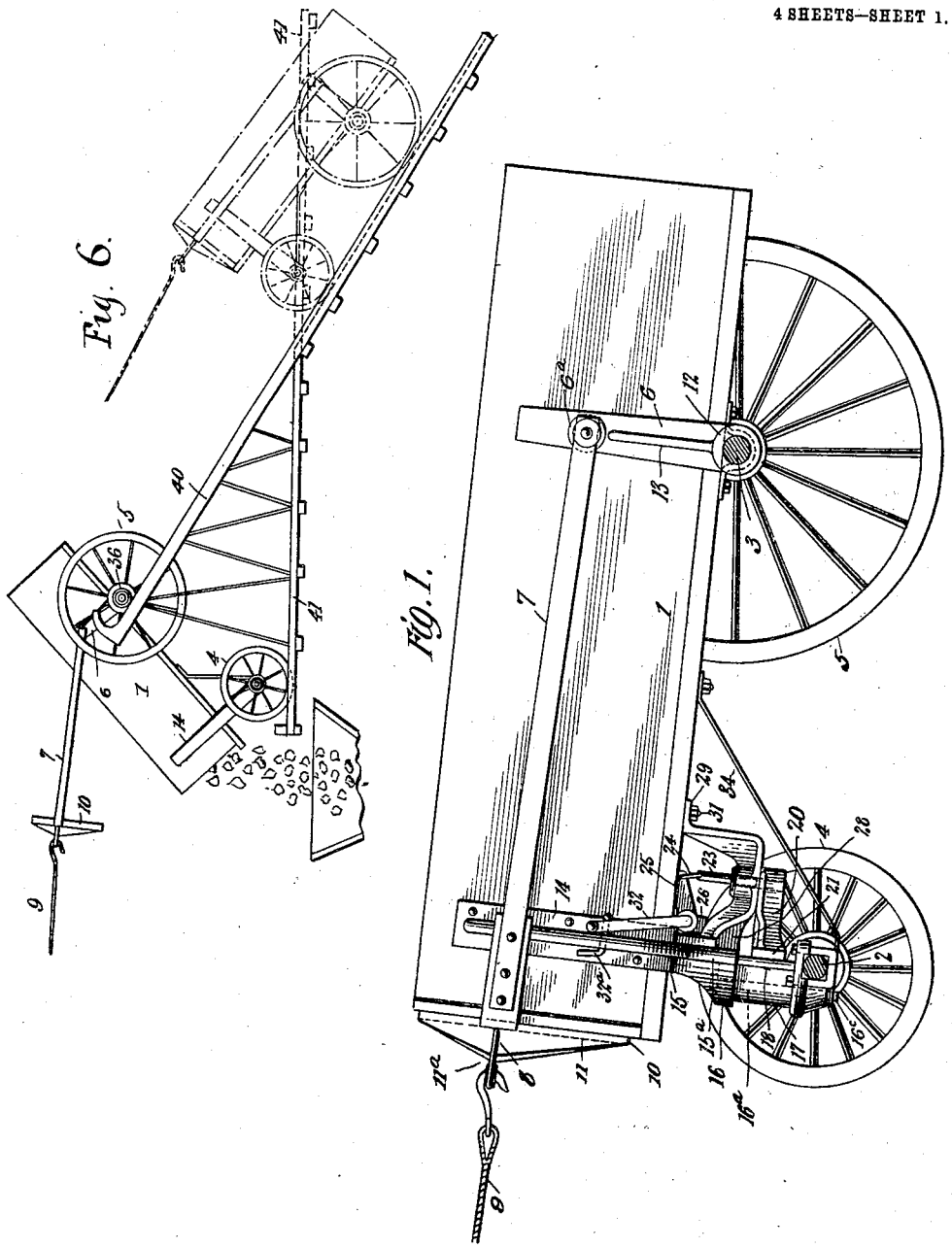

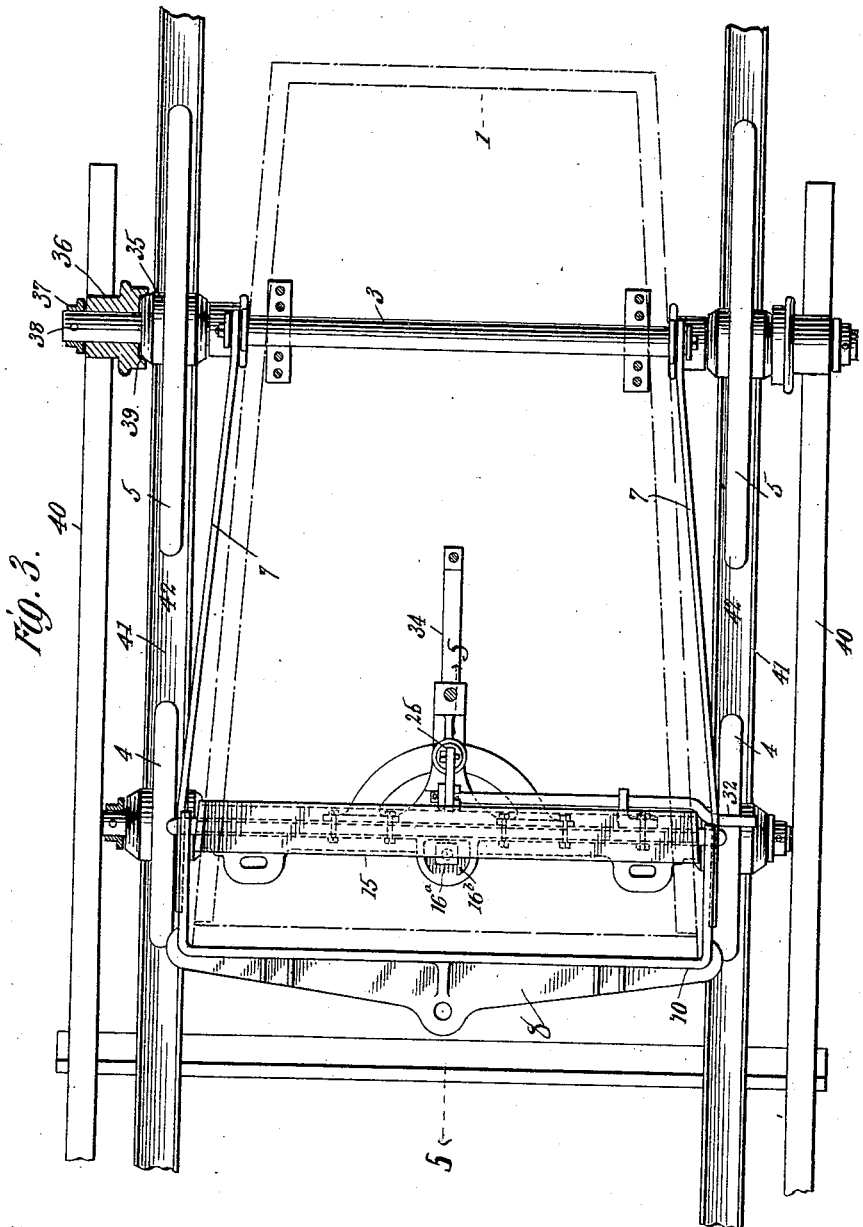

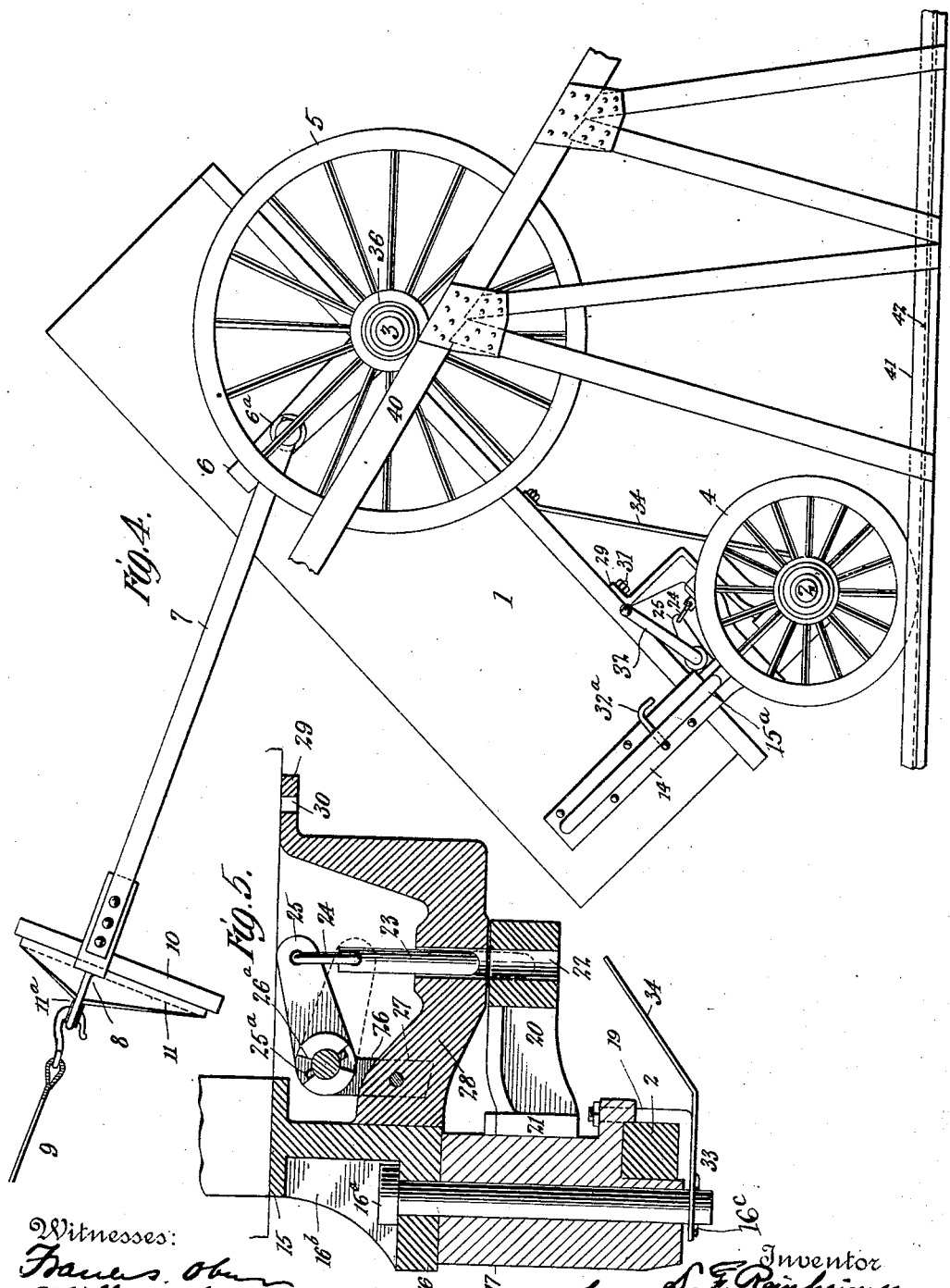

UNITED STATES PATENT OFFICE.

DAVID F. REINHEIMER, OF NEW PARIS, OHIO.

COMBINATION WAGON AND CAR.

968,419.
Specification of Letters Patent.
Patented Aug. 23, 1910.

Application filed June 26, 1909. Serial No. 504,582.

*To all whom it may concern:*

Be it known that I, DAVID F. REINHEIMER, of New Paris, county of Preble, and State of Ohio, have invented a new and useful Improvement in Combination Wagons and Cars, of which the following is a specification.

This invention relates to a combination wagon and car adapted, particularly for the transportation of stone, coal, ore, or the like, from a quarry or mine to a crusher, tipple, or other point of discharge of its contents.

The object of the invention is to provide a vehicle which may be utilized as a wagon while conveying its contents to a tramway or the like, and, then, as a car for carrying the material (be it stone, coal, ore, or the like) with which it is loaded, to a point where such material is dumped from the vehicle into a receptacle or the like.

A further object is to combine in such a vehicle all elements essential to its use as a wagon, as a car, and as a dumping apparatus.

With these and other objects in view, the invention resides in various novel parts and devices combined, arranged, operating and coöperating as hereinafter described and claimed.

In the accompanying drawings, in which like reference characters indicate corresponding parts, and in which I have illustrated one embodiment of my invention:—Figure 1 is a side elevation of a combined wagon and car in which my invention is embodied, the wheels on one side being removed to show the parts more clearly. Fig. 2 is a front view thereof. Fig. 3 is a top plan view, certain of the parts at the lower portion of the view appearing in horizontal section. Fig. 4 is a view similar to Fig. 1, showing the vehicle as it appears in the operation of dumping its contents. Fig. 5 is a fragmentary view in vertical sectional elevation on the line 5—5 of Fig. 3. Fig. 6 is a view similar to Fig. 5 showing, in dotted lines, the vehicle traveling up an inclined track and, in full lines, the same as it appears in the operation of dumping its contents into a bucket or the like.

Referring to the drawings: 1 designates the body of the open-topped vehicle, which, in this instance, is supported on front and rear axles 2 and 3, each carrying wheels 4 and 5 respectively. The vehicle body is preferably wider at the front than at the rear, as shown in Fig. 3. Supported by the rear axle 3, at each end thereof, are tapering uprights or standards 6, upon a bearing member $6^a$, on which are fulcrumed, near their top, a bail or three-sided frame 7, the side and front members thereof normally occupying a position parallel with the sides and front walls of the vehicle-body, and provided with an angulated hook-engaging member or gate bar 8 at its front portion, to afford means for attaching a rope or cable 9 for effecting a dumping-action of the vehicle, as will presently be explained. The front wall 10 of the vehicle-body is displaceable in order to act as a gate, and, to this end, has secured to it two vertical brace-members 11, the outer surface of which extends outwardly above its center to form two oppositely inclined planes. At the juncture $11^a$ of these, the gate-bar is formed as a part of said brace-members. The lower ends of the standards 6 are, preferably, formed as an axle bearing 12 and encircle the outer portions of the axle. An upwardly-extending rib 13 strengthens the standard to withstand the strain imposed upon it as a result of fulcruming the rear ends of the bail thereon.

Secured to the front portion of the side-walls of the vehicle-body are vertical front standards 14, these being, in this instance, upwardly-extending portions of a horizontal portion 15 which extends beneath the vehicle-body, there being a central longitudinal strengthening rib or enlargement $15^a$ extending from near the upper end of the outer face, of one standard along the lower face of said horizontal portion and up the outer face of the opposite standard. At its central portion, the rib is enlarged to present a forwardly extending bearing bracket 16, its upper surface inclining downwardly, and is provided with a vertical opening to receive the upper end of a bolt $16^a$ which extends through the opening and vertical boss or enlargement 17 formed integral with a transverse axle-cap 18 adapted to be clamped to the front axle, as by the axle-clips 19, two of these encompassing the axle-cap and axle near the center, and two at the wheel-ends of the axle. The bolt $16^a$ has, as usual, a head at its upper end, which is seated in an enlarged opening $16^b$ in the boss, and carries a nut 16ᶜ at its lower end to engage against the lower end of the boss, as clearly shown in Fig. 2. At each end of the axle-cap, there is an eye-projection, in which, the shafts or the pole are connected.

Secured to the rear face of the axle-cap 18, and projecting rearwardly therefrom, is the lower member 20 of the fifth-wheel device of the vehicle. This member is a semi-circular skeleton piece provided at its ends with flat-surfaced flanges 21 to afford means for bolting the member to the axle-cap; and is also provided at its middle with a thickened portion in which there is a vertical hole 22 adapted to receive the lower end of a tapered lock-pin 23 carrying at its upper end a ring 24 which, in turn, passes through the rear end of an arm 25 pivoted in the upper portion of an upstanding post 26 securely pinned in a hole 27 in a rearwardly-extending bracket 28 mounted on the rear face of the axle cap and in a plane to overlie the lower member 20, and which bracket projects rearwardly from said axle-cap, all as shown in Fig. 5. The bracket is of irregular form in cross-section and, at its outer free portion has a horizontal projection 29 provided with a bolt-hole 30 to receive a bolt or screw 31 that extends into the bottom of the vehicle-body. These parts, just described, constitute the elements forming the fifth-wheel of the vehicle, and which are so arranged as to enable the locking-pin 23 to be partly withdrawn from its locking position in the lower member 20. To effect withdrawal of the pin 23, a lock lever 32 is fixedly connected with the arm 25 and extends beneath the vehicle-body and somewhat beyond the vertical plane of the side thereof, and then, being bent in the form of a crank, extends upwardly and then outwardly. To limit the movement of said arm 25 upwardly as well as downwardly, it is provided with two abutment projections 25ᵃ designed to abut against shoulders 26ᵃ formed on the post 26, as appears in Fig. 5. It will be understood that normally, the lock-pin 23 does not extend into the hole 22 in the member 20; but when the wagon shall have arrived at the foot of an inclined track (hereinafter referred to) to transform it into a car and for performing the dumping operation, it is necessary to lock the members of the fifth-wheel together, and, to accomplish this, the locking lever is actuated to the adjusted position shown in Fig. 4 from normal position shown in Fig. 4; and this forces the locking pin into its locking position in the member 20. To retain the locking lever in normal position, an angulated arm 32ᵃ is pivoted on the front standard and in position to engage and hold the crank portion of the lever in position.

Secured to the member 16 at 33 on the front of the vehicle is a brace 34 which extends rearward and upward to the bottom of the vehicle body where it is secured. This affords an additional bracing of the front parts of the vehicle.

As is usual, the rear wheels of the vehicle are of larger diameter than the front wheels. In this instance, I provide beyond the outer ends of the hubs 35 of these rear wheels wide dumping-track spools 36, the same being carried by the axle 3 and held in place by the washer 37, as shown in Fig. 3 and the washers being held in place by pins 38. These spools are, on their inner faces, incut to form a recess 39 by which arrangement the spool will, at its rear portion, slightly overlap the outer face of the hub. These spools are designed to engage inclined dumping tracks 40, one in the path of the spool on each side of the vehicle, but sufficiently spaced to permit the front-wheels to pass freely therebetween.

In order to guide the front-wheels and keep them from striking the dumping tracks when a dumping operation of the vehicle is to be effected, I provide a horizontal U-shaped channel-track 41, the same being formed with side-flanges to form a channel 42 (Fig. 2), and arranged in juxtaposition to the dumping-track 40. The tracks 40 and 41 are preferably arranged on a suitable supporting platform or frame-work.

It will now be understood that the vehicle is driven to this platform and the front wheels traverse the channel-tracks until the spools on the rear axles impinge against the dumping-tracks 40, whereupon said spools travel upwardly upon said inclined track 40, while the front wheels continue their forward travel on the channeled tracks 41 until they reach the end thereof contiguous to the dumping point. The fifth-wheel locking lever is then actuated to lock the parts, as already explained. In the meantime the rope which is attached to the bail and which preferably passes over a pulley, is operated to raise the forward end of the bail. This elevates the rear portion of the vehicle and at the same time displaces the gate at the front of the vehicle-body, whereupon the contents of the vehicle will be dumped, as shown in Fig. 4. During the dumping-operation, the vehicle-body fulcrums on the front axle and is thus permitted to have a free and easy movement. At the same time, it is to be noted that by the arrangement I have disclosed, there is no danger of deflecting the cart from its tracks, and the draft on the same is centrally disposed.

In Fig. 6 I have shown the vehicle in dotted lines as traveling upon an inclined portion of the guiding tracks, and, in full lines, as the same appears when the front wheels have reached the dumping end of the horizontal portion of the tracks, and the rear portion of the vehicle elevated in order to dump the contents of the car into a receiving bucket.

While I have, in the foregoing, described the details of my invention, it is to be understood that the invention is not limited to any specific details except in so far as such limitations are specified in the following claims.

Having thus described my invention, its construction and mode of operation, what I claim and desire to secure by Letters Patent of the United States, is as follows:

1. In a dumping vehicle, a body-portion, front and rear axles connecting therewith to support the same, wheels mounted upon said axles, and some of which are adapted to engage an inclined abutment in their path of travel and traverse the same, means for dumping the vehicle at the rear, independent means for guiding the remaining wheels, an end-gate normally positioned to close one end of the vehicle-body, means for actuating said gate out of normal position when the vehicle is in dumping position, a movable connection between the body-portion and one of said axles, and means actuated by the dumping movement of the vehicle for locking said connection to the axle.

2. In a dumping vehicle, a body-portion, front and rear axles for supporting the same, wheels mounted upon said axles, means carried by the wheels at one end of the vehicle and adapted to engage an inclined abutment in the path of travel of the same, means carried by the vehicle for elevating that end of the vehicle while it is fulcruming on the axle at the opposite end thereof, means for maintaining the parts of the vehicle in operative position during said elevating movement, an end-gate normally positioned to close one end of the vehicle-body, means for actuating said gate out of normal position when the vehicle is in dumping position, a movable connection between the body-portion and one of said axles, and means actuated by the dumping movement of the vehicle for locking said connection to the axle.

3. In a dumping vehicle, a tiltable body-portion, front and rear wheels for sustaining said body-portion, axles interposed between the wheels and the body-portion, one of said axles operating as a fulcrum for the body-portion when it is tilted, a movable connection between said body-portion and the axle, means connecting with the body-portion for effecting an upward tilting of one end thereof, means connecting with the axle at the opposite end for locking the said movable connection to the body-portion while being tilted.

4. In a combined wagon and car, a body-portion, front and rear wheels for sustaining the same, axles supported on said wheels and connecting with the body-portion, spools carried by the rear axles to one side of the wheels thereon, a lifting device connecting with the rear end of the vehicle, a movable connection between said body-portion and the axle at the front of the vehicle, and means for locking the movable connection against transverse movement while the lifting device is operating.

5. In a combined wagon and car, a body-portion, a gate carried by the same, front and rear wheels for sustaining the body-portion, axles supported on said wheels and connecting with the body-portion, rotatable members carried by the rear axles, a lifting device connecting with the rear end of the vehicle and with the gate and operating to elevate the rear end of the body-portion and to displace the gate, a movable connection carried by the front axle and engaging with the body-portion, and means for locking the movable connection to the axle.

6. In a combined wagon and car, a body-portion, a gate carried by the same, front and rear wheels for sustaining the body-portion, axles supported on said wheels and connecting with the body-portion, rotatable members carried by the rear axles, a lifting device connecting with the rear end of the vehicle and with the gate and operating to elevate the rear end of the body-portion and to displace the gate, a movable connection underlying the body-portion and carried by the front axle, an axle cap carried by the front axle, a bracket carried by the axle-cap, and a member rearwardly extending from the axle cap, and a locking member carried by one of said elements and engaging the other to lock the same together.

7. In a combined wagon and car, a body-portion, a gate carried by the same, front and rear wheels for sustaining the body-portion, axles supported on said wheels and connecting with the body-portion, rotatable members carried by the rear axles, a lifting device connecting with the rear end of the vehicle and with the gate and operating to elevate the rear end of the body-portion and to displace the gate, a movable connection underlying the body-portion and carried by the front axle, an axle-cap carried by the front axle, a bracket carried by the axle-cap, a member rearwardly extending from the axle cap, a locking-member carried by one of said elements and engaging the other to lock the same together, and a locking-operating lever connecting with said locking-member and carried by the vehicle-body.

8. In a combined wagon and car, a body-portion, a gate carried by the same, front and rear wheels for sustaining the body-portion, axles supported on said wheels and connecting with the body-portion, rotatable members carried by the rear axles, a lifting device connecting with the rear end of the vehicle and with the gate and operating to elevate the rear end of the body-portion and to displace the gate, a movable connection underlying the body portion and carried by the front axle, an axle-cap carried by the front axle, a bracket carried by the axle-cap, a member rearwardly extending from the axle-cap, a locking-member carried by one of said elements and engaging the other to lock the same together, and means for limiting movement of the locking parts.

In testimony whereof I hereunto set my hand this 28th day of May, 1909, in the presence of two attesting witnesses.

DAVID F. REINHEIMER.

Witnesses:
C. L. REINHEIMER,
W. C. REINHEIMER.